(12) United States Patent
Heibel et al.

(10) Patent No.: US 6,365,709 B1
(45) Date of Patent: Apr. 2, 2002

(54) METHOD OF REDUCING THE QUANTITY OF RESIDUAL MONOMERS IN AQUEOUS DISPERSIONS OF POLYMERS

(75) Inventors: Claudia Heibel, Weinheim; Roland Baumstark, Neustadt, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/786,273

(22) PCT Filed: Aug. 25, 1999

(86) PCT No.: PCT/EP99/06223
§ 371 Date: Mar. 2, 2001
§ 102(e) Date: Mar. 2, 2001

(87) PCT Pub. No.: WO00/14123
PCT Pub. Date: Mar. 16, 2000

(30) Foreign Application Priority Data
Sep. 5, 1998 (DE) .......................................... 198 40 586

(51) Int. Cl.$^7$ ................................................. C08F 6/00
(52) U.S. Cl. ....................................................... 528/480
(58) Field of Search .......................................... 528/480

(56) References Cited

U.S. PATENT DOCUMENTS

| | | | |
|---|---|---|---|
| 4,529,753 A | 7/1985 | Taylor | |
| 4,904,727 A | 2/1990 | Probst et al. | |
| 5,087,676 A | 2/1992 | Heider et al. | |
| 5,376,703 A | 12/1994 | Noelken et al. | |
| 5,994,457 A | 11/1999 | Stanger et al. | |

FOREIGN PATENT DOCUMENTS

| | | |
|---|---|---|
| CA | 2224287 | 2/1997 |
| DE | 37 18 520 | 12/1988 |
| DE | 38 34 734 | 4/1990 |
| DE | 42 32 194 | 3/1994 |
| DE | 44 19 518 | 12/1995 |
| DE | 195 29 599 | 2/1997 |
| DE | 197 41 187 | 3/1999 |
| DE | 198 39 199 | 3/2000 |
| EP | 0 003 957 | 9/1979 |
| EP | 0 028 348 | 5/1981 |
| EP | 0 363 795 | 4/1990 |
| EP | 0 563 726 | 10/1993 |
| EP | 0 764 699 | 3/1997 |
| EP | 0 767 180 | 4/1997 |
| WO | WO 95/33775 | 12/1995 |

*Primary Examiner*—Terressa M. Boykin
(74) *Attorney, Agent, or Firm*—Oblon, Spivak, McClelland, Maier & Neustadt, P.C.

(57) ABSTRACT

A process for reducing the amount of residual monomer in aqueous polymer dispersions operates by aftertreatment with an initiator system essentially comprising a) from 0.001 to 5% by weight, based on the total monomer amount used to prepare the polymer dispersion,
  $a_1$) of an oxidizing agent $R^1OOH$, 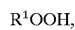

where $R^1$ is hydrogen or a $C_1$–$C_8$-alkyl or a $C_6$–$C_{12}$-aryl group, and/or
  $a_2$) of a compound which in aqueous medium releases hydrogen peroxide, and b) from 0.005 to 5% by weight, based on the total monomer amount used to prepare the polymer dispersion,
  $b_1$) of an α-hydroxycarbonyl compound

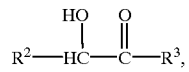

where $R^2$ and $R^3$ independently of one another are hydrogen and/or a $C_1$–$C_{12}$-alkyl group which may contain functional groups and/or may be olefinically unsaturated, or $R^2$ and $R^3$ optionally, by way of methylene groups, form a ring structure which may contain functional groups and/or may be olefinically unsaturated, and/or
  $b_2$) of a compound which in aqueous medium releases such α-hydroxycarbonyl compounds, and c) advantageously, catalytic amounts of a polyvalent metal ion which is able to exist in a plurality of valence states.

16 Claims, No Drawings

METHOD OF REDUCING THE QUANTITY OF RESIDUAL MONOMERS IN AQUEOUS DISPERSIONS OF POLYMERS

The invention relates to a process for reducing the amount of residual monomer in aqueous polymer dispersions by chemical aftertreatment with a specific redox initiator system.

Following their preparation by free-radical polymerization or copolymerization, aqueous polymer dispersions include not only a polymer solids fraction of from 30 to 75% by weight but also, owing to the incomplete polymerization of the monomers employed in the free-radical main polymerization, which is usually carried out to a monomer conversion of 95 and preferably 98 to 99% by weight, an unwanted fraction of unpolymerized free monomers (residual monomers). On mainly toxicological grounds the market Far requires aqueous polymer systems having a low residual monomer content with no change in processing and use properties.

In addition to the nonchemical methods such as stripping with inert gas or steam, a wide variety of chemical methods, such as described, for example, in EP-B 003 957, EP-B 028 348, EP-B 563 726, EP-A 764 699, U.S. Pat. No. 4,529,753, DE-A 37 18 520, DE-A 38 34 734, DE-A 42 32 194 and DE-A 195 29 599, is available for lowering residual monomer contents of aqueous polymer dispersions.

For the use of carbonyl compounds and/or their reaction products in the aftertreatment of aqueous polymer dispersions it is necessary to start from the following prior art.

According to WO 95/33775, aqueous polymer dispersions can be aftertreated using redox systems whose reducing agent comprises an adduct of hydrogen sulfite anion and a ketone of 3 to 8 carbon atoms, and/or the conjugate acid of said adduct. Aftertreatment is performed in the presence of metal compounds that are soluble in the aqueous medium.

For the reduction of residual monomer contents, EP-A 767 180 advises a redox initiator system comprising organic hydroperoxides whose solubility in water is, at best, poor and, inter alia, adducts of aldehydes having a carbon chain of 4 to 6 carbon atoms with bisulfites.

The German patent application with the file reference 197 411 87.8, unpublished at the priority date of the present application, discloses using a system comprising an oxidizing agent and an organic α-hydroxy carboxylic acid for chemical removal of residual monomers.

In the German patent application with the file reference 198 391 99.4, likewise unpublished at the priority date of the present application, the use of oxidizing agents in combination with a redox system consisting of an aldehyde and an inorganic dithionite is disclosed for bringing about depletion of residual monomers.

It is an object of the present invention to provide a new and effective process for reducing the amount of residual monomer in aqueous polymer dispersions. The intention is also that the reducing of the amount of residual monomer should be easy to utilize industrially without the formation of microcoagulum.

We have found that this object is achieved and thus that the amount of residual monomers in aqueous polymer dispersions can be effectively reduced if the aftertreatment of the aqueous polymer dispersions comprising residual monomers is accompanied by the addition of a redox initiator system comprising essentially a) from 0.001 to 5% by weight, based on the total monomer amount used to prepare the polymer dispersion, $a_1$) of an oxidizing agent

R$^1$OOH, where R$^1$ is hydrogen or a $C_1$–$C_8$-alkyl or a $C_6$–$C_{12}$-aryl group, and/or $a_2$) of a compound which in aqueous medium releases hydrogen peroxide, and b) from 0.005 to 5% by weight, based on the total monomer amount used to prepare the polymer dispersion, $b_1$) of an α-hydroxycarbonyl compound

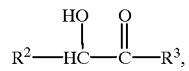

where $R^2$ and $R^3$ independently of one another are hydrogen and/or a $C_1$–$C_{12}$-alkyl group which may contain functional groups and/or may be olefinically unsaturated, or $R^2$ and $R^3$ optionally, by way of methylene groups, form a ring structure which may contain functional groups and/or may be olefinically unsaturated, and/or $b_2$) of a compound which in aqueous medium releases such α-hydroxycarbonyl compounds, and c) advantageously, catalytic amounts of a polyvalent metal ion which is able to exist in a plurality of valence states.

The oxidizing agent of the redox initiator system should be in a position to form free radicals. Oxidizing agents employed in the redox system are preferably hydrogen peroxide but also include sodium peroxide, potassium peroxide, sodium perborate, and other precursors which in aqueous medium form hydrogen peroxide. It is also possible, for example, to employ ammonium, potassium or sodium persulfate, peroxodisulfuric acid and its salts, ammonium, potassium or sodium perphosphate or diperphosphate, potassium permanganate, and other salts of peracids. Also suitable in principle are organic hydroperoxides, such as tert-butyl hydroperoxide and cumene hydroperoxide. It is, however, also possible to employ mixtures of different oxidizing agents mentioned above.

The amount of added oxidizing agent is usually within a range from 0.001 to 5, preferably from 0.002 to 3, with particular preference from 0.003 to 2, with very particular preference from 0.01 to 1.5 and, preferably, from 0.02 to 1% by weight, based on the total monomer amount.

Suitable reducing agents are generally aliphatic α-hydroxycarbonyl compounds, such as aliphatic α-hydroxy aldehydes and/or aliphatic α-hydroxy ketones, isomeric compounds thereof and/or functional group substituted compounds thereof and/or olefinically unsaturated compounds thereof and mixtures thereof, and also precursors which in aqueous solution release these α-hydroxycarbonyl compounds, examples being acetals and mercaptals. Examples that may be mentioned of α-hydroxycarbonyl compounds are glycol aldehyde and/or its dimer 2,5-dihydroxy-1,4-dioxane, phenyl glycol aldehyde, 2-hydroxy-3-phenylpropionaldehyde, glyceraldehyde and its higher homologous compounds, such as aldotetroses, aldopentoses and aldohexoses, and also α-hydroxyacetone, α,α'-dihydroxyacetone, 1-hydroxy-2-butanone, 1-hydroxy-2-pentanone, 1-hydroxy-2-hexanone, 3-hydroxy-2-butanone (acetoin), 4-hydroxy-2-hepten-5- one, 2-hydroxy-3-pentanone, 3-hydroxy-2-pentanone, 3-hydroxy-4-heptanone, 4-hydroxy-3-heptanone, 4-hydroxy-2,2-dimethyl-3-pentanone, 3-hydroxy-2,2-dimethyl-4-pentanone, 2-hydroxy-1-phenyl-1-propanone, 1-hydroxy-1-phenyl-2-propanone, 1-hydroxy-1-phenyl-2-butanone, 2-hydroxy-1-phenyl-1-butanone, 2-hydroxy-1,2-diphenylethanone (benzoin), 2-hydroxy-1-phenyl-1,4-pentanedione, 1-hydroxy-1-phenyl-2,4-pentanedione, and cyclic α-hydroxy ketones, such as 2-hydroxycyclohexanone (adipoin) and 2-hydroxycyclopentanone (glutaroin). Preference is given to the use of α-hydroxyacetone, α,α'-dihydroxyacetone, 1-hydroxy-2-butanone, 1-hydroxy-2-pentanone and/or 3-hydroxy-2-butanone (acetoin), with particular preference to the use of α-hydroxyacetone and/or α,α'-dihydroxyacetone.

The amount of added reducing agent is customarily within the range from 0.005 to 5, preferably from 0.01 to 3, with particular preference from 0.03 to 2 and, with very particular preference, from 0.05 to 1% by weight, based on the total monomer amount. Higher amounts of reducing agent, although possible, are not generally sensible from the economic standpoint.

The metal compounds advantageous for the aftertreatment are, customarily, completely soluble in the aqueous medium of the polymer dispersion, and their metallic component, moreover, is capable of existing in a plurality of valence states. The dissolved metal ions have a catalytic effect and assist the electron transfer reactions between the actually active oxidizing and reducing agents. Suitable dissolved metal ions are principally iron, copper, manganese, vanadium, nickel, cobalt, titanium, cerium, and chromium ions. It is of course also possible to use mixtures of different, mutually compatible metal ions, such as the system $Fe^{2/3+}/VSO_4^-$. Preferably, iron ions are employed.

The dissolved metal ions are used in catalytic amounts based on the mass of total monomer, customarily from 1 to 1000, preferably from 5 to 500 and, with particular preference, from 10 to 100 ppm.

For the aftertreatment of the polymer dispersion which is heated at from about 50 to 130, preferably from 60 to 120 and, with particular preference, from 80 to 100° C. the components of the initiator system used in accordance with the invention are judiciously metered in gradually with stirring, preferably under atmospheric pressure or, alternatively, under a pressure of greater than or less than I bar (absolute), metered addition taking place simultaneously or in succession, in the latter case preferably with addition of the oxidizing agent first. A particularly favorable procedure is the simultaneous metered addition of oxidizing and reducing agent by way of two separate feed streams. In this case the initiator components, for example, can be added from above, from below or through the side of the reactor. Preferably, however, the initiator system is metered in from below. Since the optimum duration of initiator metering is dependent on the monomer composition, on the size of the reaction mixture, and on the reactor geometry, inter alia, it is judicious to determine said duration in preliminary experiments. Depending on the task at hand, the duration of addition of initiator may extend from a few seconds to several hours. It is particularly favorable for the metal compound, which is employed in catalytic amounts, to be added to the polymer dispersion prior to the addition of the oxidizing and reducing agent.

The aftertreatment is generally conducted at a pH of $\leq 10$. To adjust the pH of the polymer dispersion it is possible in principle to use bases, such as sodium hydroxide solution, aqueous ammonia, or triethanolamine, for example. For the aftertreatment of the polymer dispersion a favorable pH range is that $\geq 2$ and $\leq 10$, with preference being given to a pH range of between >6 and $\leq 8$. If the pH is established using bases, however, the catalyzing metal ions could be converted into poorly soluble hydroxides or hydroxo complexes. To ensure sufficient concentrations of metal ions during the aftertreatment, therefore, it is particularly advantageous to add complexing agents, such as ethylenediaminetetraacetic acid, nitrilotriacetic acid and diethylenetriaminepentaacetic acid and/or the respective sodium salts, and/or to use stable metal ion complexes, such as iron (III)/sodium ethylenediaminetetraacetate, for example.

The process of the invention is particularly suitable for reducing the amount of residual monomer in aqueous polymer dispersions obtainable by free-radical emulsion polymerization of monomers having at least one ethylenically unsaturated group.

Suitable monoethylenically unsaturated monomers for the process of the invention include, in particular, monomers which can be subjected to free-radical polymerization in a simple manner, examples being the olefins ethylene, vinylaromatic monomers such as styrene, o-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate and vinyl stearate, esters of preferably $C_3$–$C_6$ α,β-monoethylenically unsaturated mono- and dicarboxylic acids, such as especially acrylic, methacrylic, maleic, fumaric and itaconic acid, with generally $C_1$–$C_{12}$-, preferably $C_1$–$C_8$- and in particular $C_1$–$C_4$-alkanols, such as, in particular, methyl, ethyl, n-butyl, isobutyl and 2-ethylhexyl acrylate and methacrylate, dimethyl or di-n-butyl maleate, nitriles of α,β-monoethylenically unsaturated carboxylic acids, such as acrylonitrile, and $C_{4-8}$ conjugated dienes, such as 1,3-butadiene and isoprene. In the case of aqueous polymer dispersions produced exclusively by the method of free-radical aqueous emulsion polymerization, said monomers generally form the principal monomers which, based on the total amount of monomers to be polymerized by the process of free-radical aqueous emulsion polymerization, normally account for a proportion of more than 50% by weight. As a general rule, the solubility of these monomers in water under standard conditions (25° C., 1 atm) is moderate to poor.

Examples of monomers having a heightened solubility in water under the above conditions are α,β-monoethylenically unsaturated monocarboxylic and dicarboxylic acids and their amides, examples being acrylic acid, methacrylic acid, maleic acid, fumaric acid, itaconic acid, acrylamide, and methacrylamide, and also vinylsulfonic acid and its water-soluble salts, and N-vinyl-pyrrolidone.

In the case of aqueous polymer dispersions produced exclusively by the method of free-radical aqueous emulsion polymerization, the abovementioned monomers of heightened solubility in water are normally copolymerized only as modifying monomers, in amounts, based on the total amount of the monomers to be polymerized, of less than 50% by weight, generally from 0.5 to 20% by weight and, preferably, from 1 to 10% by weight.

Monomers which usually enhance the internal strength of the films of the aqueous polymer dispersions normally have at least one epoxy, hydroxyl, N-methylol or carbonyl group, or at least two nonconjugated ethylenically unsaturated double bonds. Examples thereof are N-alkylolamides of $C_3$–$C_{10}$ α,β-monoethylenically unsaturated carboxylic acids, among which very particular preference is given to N-methylolacrylamide and N-methylolmethacrylamide, and their esters with $C_1$–$C_4$-alkanols. Also suitable are monomers having two vinyl radicals, two vinylidene radicals, or two alkenyl radicals. Particularly advantageous in this context are the diesters of dihydric alcohols with $\alpha,\beta$-monoethylenically unsaturated monocarboxylic acids, among which acrylic and methacrylic acid are preferred. Examples of such monomers having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, and triallyl cyanurate. Of particular importance in this context are, in addition, the methacrylic and acrylic acid $C_1$–$C_8$-hydroxyalkyl esters, such as n-hydroxyethyl, n-hydroxypropyl or n-hydroxybutyl acrylate and methacrylate, and also compounds such as diacetoneacrylamide and acetylacetoxyethyl acrylate and methacrylate. In the case of aqueous polymer dispersions produced exclusively by the method of free-radical aqueous emulsion polymerization, the abovementioned monomers are copolymerized customarily in amounts of from 0.5 to 10% by weight, based on the total amount of monomers to be polymerized.

The preparation of aqueous polymer dispersions has been described beforehand on numerous occasions and is therefore sufficiently well known to the skilled worker [cf. e.g. Encyclopedia of Polymer Science and Engineering, Vol. 8, pp. 659 ff. (1987); D.C. Blackley, in High Polymer Latices, Vol. 1, pp. 35 ff.(1966); Emulsion Polymerisation, Interscience Publishers, New York (1965) and Dispersionen synthetischer Hochpolymerer, F. Hölscher, Springer-Verlag, Berlin (1969)]. It takes place by emulsion polymerization of monomers having at least one olefinically unsaturated group in the presence of a preferably water-soluble polymerization initiator and of emulsifiers and, if desired, protective colloids and customary further additives. In general, the monomers in this case are added by continuous feed. As initiator it is preferred to use peroxodisulfuric acid and/or its salts in amounts from 0.1 to 2% by weight based on the total amount of the monomers. The polymerization temperature is generally from 20 to 150° C. and, preferably from 60 to 120° C. The polymerization may take place under superatmospheric pressure. Emulsifiers used are, in particular, anionic emulsifiers alone or in a mixture with nonionic dispersants, in an amount of especially from 0.5 to 6% by weight of the total monomer amount.

The aftertreatment of the aqueous polymer dispersion that is carried out in accordance with the invention to reduce the amount of residual monomer is conducted in particular after at least 95 and, preferably, at least 98 to 99% by weight conversion of the total monomer amount in the free-radical emulsion polymerization. The conditions in the case of the main polymerization and in the case of the aftertreatment are generally different. Thus during the main polymerization, with a high concentration of monomers and of growing and hence more and more hydrophobic oligomer radicals, the entry of radicals into the dispersion particles takes place readily, whereas such entry is generally very difficult during the aftertreatment, owing to the low monomer concentration and the lack of growing oligomer radicals. In the preparation of aqueous polymer dispersions, therefore, different initiator systems are generally required for the main polymerization and for the aftertreatment.

Like processes of free-radical polymerization in general, the process of the invention, too, normally takes place under an inert gas atmosphere (e.g. $N_2$, Ar).

It is of course possible to subject the aftertreated aqueous polymer dispersions to stripping with inert gas and/or steam.

The free-radical redox initiator systems to be employed in accordance with the invention permit an effective reduction in the amount of residual monomer within a relatively short time. It is also worth noting that the reducing agent claimed by the invention is unable to reduce the microbicides that are generally added as preservatives to aqueous polymer dispersions, an advantage which means that the use of said reducing agent in excess does not affect the quality of the aqueous polymer dispersion in that respect.

EXAMPLES

Example 1

A styrene-n-butyl acrylate dispersion prepared by free-radical polymerization from 23 kg of styrene, 25 kg of n-butyl acrylate, 2 kg of acrylic acid, 1.2 kg of styrene seed latex dispersion (34% by weight in water, particle size about 30 to 35 nm), 300 g of sodium lauryl sulfate solution (15% strength by weight in water), 500 g of Dowfax® 2A1 solution (dodecylphenoxybenzene-disulfonic acid sodium salt), 45% strength by weight in water), 300 g of sodium hydroxide solution (25% strength by weight in water), 150 g of sodium peroxodisulfate and 46 kg of water at 80° C. had a solids content of 52% by weight and a pH of 4.3. The dispersion contained 8404 ppm of n-butyl acrylate, 1172 ppm of styrene and 2900 ppm of acrylic acid.

In the aftertreatment, 1350 g of this aqueous polymer dispersion, adjusted to a pH of 6.5 using 25% strength by weight aqueous sodium hydroxide solution, were heated to 85° C. and then 0.02 g of the sodium/iron-EDTA complex was added. Subsequently, with stirring, a) 30 g of a 1.2% strength by weight aqueous hydrogen peroxide solution and b) 30 g of a 2.35% strength by weight aqueous $\alpha,\alpha'$-dihydroxyacetone solution were metered in simultaneously in two separate feed streams each at a rate of 30 g per hour. The resultant residual amounts of n-butyl acrylate and styrene were determined by gas chromatography and the residual amounts of acrylic acid by HPLC. The results obtained in the aftertreatment are set out in Table 1.

TABLE 1

Residual monomer amounts for the aqueous polymer dispersion in the aftertreatment

| time min | styrene ppm | n-butyl acrylate ppm | acrylic acid ppm |
| --- | --- | --- | --- |
| 0 | 1172 | 8404 | 2900 |
| 60 | 170 | 4229 | |
| 120 | 54 | 2438 | |
| 240 | 46 | 2079 | 900 |

Example 2

A styrene-n-butyl acrylate dispersion prepared by free-radical polymerization from 23 kg of styrene, 25 kg of n-butyl acrylate, 2 kg of acrylic acid, 1.2 kg of styrene seed latex dispersion (34% by weight in water, particle size about 30 to 35 nm), 300 g of sodium lauryl sulfate solution (15% strength by weight in water), 500 g of Dowfax® 2A1 solution (dodecylphenoxybenzene-disulfonic acid sodium salt), 45% strength by weight in water), 300 g of sodium hydroxide solution (25% strength by weight in water), 150 g of sodium peroxodisulfate and 46 kg of water at 80° C. had a solids content of 52% by weight and a pH of 4.3.

52 g of distilled water were added to 1298 g of this dispersion to give a dispersion having a solids content of 50% by weight. The dispersion diluted to 50% by weight and adjusted to a pH of 7.0 using 25% strength by weight aqueous sodium hydroxide solution contained 5785 ppm of n-butyl acrylate, 393 ppm of styrene and 1800 ppm of acrylic acid. In the aftertreatment, this aqueous polymer dispersion was heated to 85° C. and then 0.034 g of the sodium/iron-EDTA complex was added. Subsequently, with stirring, a) 30 g of a 11.3% strength by weight aqueous hydrogen peroxide solution and b) 30 g of a 11.3% strength by weight aqueous α-hydroxyacetone solution were metered in simultaneously in two separate feed streams each at a rate of 10 g per hour. The resultant residual amounts of n-butyl acrylate and styrene were determined by gas chromatography and the residual amounts of acrylic acid by HPLC. The results obtained in the aftertreatment are set out in Table 2.

TABLE 2

Residual monomer amounts for the aqueous polymer dispersion in the aftertreatment

| time min | styrene ppm | n-butyl acrylate ppm | acrylic acid ppm |
|---|---|---|---|
| 0 | 393 | 5785 | 1800 |
| 60 | 163 | 4094 | |
| 120 | 42 | 1771 | |
| 240 | 36 | 116 | 90 |

Example 3

A styrene-butadiene dispersion was prepared by free-radical polymerization from 6 kg of styrene, 8.4 kg of 1,3-butadiene, 3.6 kg of acrylic acid, 0.41 kg of styrene seed latex dispersion (34% by weight in water, particle size about 30 to 35 nm), 135 g of Texapon® NSO solution (sodium lauryl ether sulfate having on average 2.5 ethylene oxide units; 28% strength by weight in water), 150 g of sodium hydroxide solution (10% strength by weight in water), 110 g of sodium peroxodisulfate and 18.28 kg of water at 82° C. Excess 1,3-butadiene was removed by injecting 2 bar of nitrogen with stirring into the dispersion, which had been cooled to 68° C., releasing the pressure and applying a slight underpressure (750 mbar absolute) and repeating this procedure in automated form about 1500 times. After 4 hours, a dispersion was obtained which had a solids content of 51.3% by weight, a pH of 4.8, and residual monomer contents of 1669 ppm of styrene and 280 ppm of acrylic acid.

In the aftertreatment, 1350 g of this aqueous polymer dispersion were heated to 85° C. and then 0.02 g of the sodium/iron-EDTA complex was added. Subsequently, with stirring, a) 30 g of a 1.2% strength by weight aqueous hydrogen peroxide solution and b) 30 g of a 2.3% strength by weight aqueous α,α'-dihydroxyacetone solution were metered in simultaneously in two separate feed streams each at a rate of 10 g per hour. The resultant residual amounts of styrene were determined by gas chromatography and the residual amounts of acrylic acid by HPLC. The results obtained in the aftertreatment are set out in Table 3.

TABLE 3

Residual monomer amounts for the aqueous polymer dispersion in the aftertreatment

| time min | styrene ppm | acrylic acid ppm |
|---|---|---|
| 0 | 1669 | 280 |
| 60 | 906 | |
| 120 | 545 | |
| 180 | 383 | 20 |

We claim:

1. A process for reducing the amount of residual monomer in aqueous polymer dispersions by aftertreatment with an initiator system, which comprises said aftertreatment in the aqueous polymer dispersion being accompanied by the addition of an initiator system comprising a) from 0.001 to 5% by weight, based on the total monomer amount used to prepare the polymer dispersion, a$_1$) of an oxidizing agent R$^1$OOH, 

where R$^1$ is hydrogen or a C$_1$–C$_8$ alkyl or a C$_6$–C$_{12}$-aryl group, and/or a$_2$) of a compound which in aqueous medium releases hydrogen peroxide, and b) from 0.005 to 5% by weight, based on the total monomer amount used to prepare the polymer dispersion, b$_1$) of an α-hydroxyketone and/or an α-hydroxyaldehyde compound

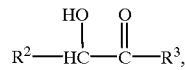

where R$^2$ and R$^3$ independently of one another are hydrogen and/or a C$_1$–C$_{12}$-alkyl group which may contain functional groups and/or may be olefinically unsaturated, or R$^2$ and R$^3$ optionally, by way of methylene groups, form a ring structure which may contain functional groups and/or may be olefinically unsaturated, and/or b$_2$) of a compound which in aqueous medium releases such α-hydroxyketone and/or α-hydroxyaldehyde compounds, and c) optionally, catalytic amounts of a polyvalent metal ion which is able to exist in a plurality of valence states.

2. A process as claimed in claim 1, wherein the oxidizing agent is an inorganic compound.

3. A process as claimed in claim 1, wherein the oxidizing agent is a hydrogen peroxide.

4. A process as claimed in claim 1, wherein R$^2$ is hydrogen and R$^3$ is a methyl group.

5. A process as claimed in claim 1, wherein $R^2$ is hydrogen and $R^3$ is a hydroxymethyl group.

6. A process as claimed in claim 1, wherein $R^2$ and $R^3$ are each a methyl group.

7. A process as claimed in claim 1, wherein component a) and component b) are supplied simultaneously in separate feed streams to the polymer dispersion during the aftertreatment.

8. A process as claimed in claim 1, wherein the metal ions are added to the polymer dispersion in the aftertreatment prior to component a) and component b).

9. A process as claimed in claim 1, wherein iron ions are employed as polyvalent metal ion.

10. A process as claimed in claim 1, wherein the iron ions are added in complexed form.

11. A process as claimed in claim 1, wherein the temperature of the polymer dispersion during the aftertreatment is from 50 to 130° C.

12. A process as claimed in claim 1, wherein the aftertreatment is conducted at superatmospheric pressure, at atmospheric pressure (1 bar absolute) or at subatmospheric pressure.

13. A process as claimed in claim 1, wherein the pH of the polymer dispersion during the aftertreatment is $\geq 2$ and $\leq 10$.

14. A process as claimed in claim 1, wherein component b) is at least one compound selected from the group consisting of glycol aldehyde, 2,5-dihydroxy-1,4-dioxane, phenyl glycol aldehyde, 2-hydroxy-3-phenylpropionaldehyde, glyceraldehyde, aldotetroses, aldopentoses, aldohexoses, α-hydroxyacetone, α,α'-dihydroxyacetone, 1-hydroxy-2-butanone, 1-hydroxy-2-pentanone, 1-hydroxy-2-hexanone, 3-hydroxy-2-butanone (acetoin), 4-hydroxy-2-hepten-5-one, 2-hydroxy-3-pentanone, 3-hydroxy-2-pentanone, 3-hydroxy-4-heptanone, 4-hydroxy-3-heptanone, 4-hydroxy-2,2-dimethyl-3-pentanone, 3-hydroxy-2,2-dimethyl-4-pentanone, 2-hydroxy-1-phenyl-1-propanone, 1-hydroxy-1-phenyl-2-propanone, 1-hydroxy-1-phenyl-2-butanone, 2-hydroxy-1-phenyl-1-butanone, 2-hydroxy-1,2-diphenylethanone (benzoin), 2-hydroxy-1-phenyl-1,4-pentanedione, 1-hydroxy-1-phenyl-2,4-pentanedione, 2-hydroxycyclohexanone (adipoin), and 2-hydroxycyclopentanone (glutaroin).

15. A process as claimed in claim 1, wherein component b) is at least one compound selected from the group consisting of α-hydroxyacetone, α,α'-dihydroxyacetone, 1-hydroxy-2-butanone, 1-hydroxy-2-pentanone and 3-hydroxy-2-butanone (acetoin).

16. A process as claimed in claim 1, wherein component b) is at least one compound selected from the group consisting of α-hydroxyacetone and α,α'-dihydroxyacetone.

* * * * *